United States Patent [19]

Tardif

[11] Patent Number: 4,912,875
[45] Date of Patent: Apr. 3, 1990

[54] FLOWER POT AND SAUCER

[75] Inventor: Pierre Tardif, Longueuil Quebec, Canada

[73] Assignee: Plastique DCN Inc., Warwick, Canada

[21] Appl. No.: 315,929

[22] Filed: Feb. 27, 1989

[51] Int. Cl.$^4$ .............................................. A01G 9/02
[52] U.S. Cl. ....................................................... 47/66
[58] Field of Search ................ 47/66, 67, 71; 248/154

[56] References Cited

U.S. PATENT DOCUMENTS

| | | | |
|---|---|---|---|
| 1,971,075 | 8/1934 | Lockwood | 47/66 |
| 4,227,343 | 10/1980 | Espy et al. | 47/67 |
| 4,299,055 | 11/1981 | Dziewulski et al. | 47/71 |

Primary Examiner—David A. Scherbel
Assistant Examiner—Michele A. VanPatten
Attorney, Agent, or Firm—Nixon & Vanderhye

[57] ABSTRACT

The disclosure herein describes a plant assembly that includes a pot and a saucer adapted to be nested together in similarly constructed assemblies; the pot consists of an inverted frusto-conical body with an elongated hollow conically-shaped central part upwardly extending from the bottom wall thereof; the saucer consists of a cylindrical body that includes also a frusto-conical central part that extends upwardly from the bottom wall. Both central parts have enlarged lower areas defining supports allowing similarly constructed pot and saucer assemblies to be nested one within the other.

20 Claims, 2 Drawing Sheets

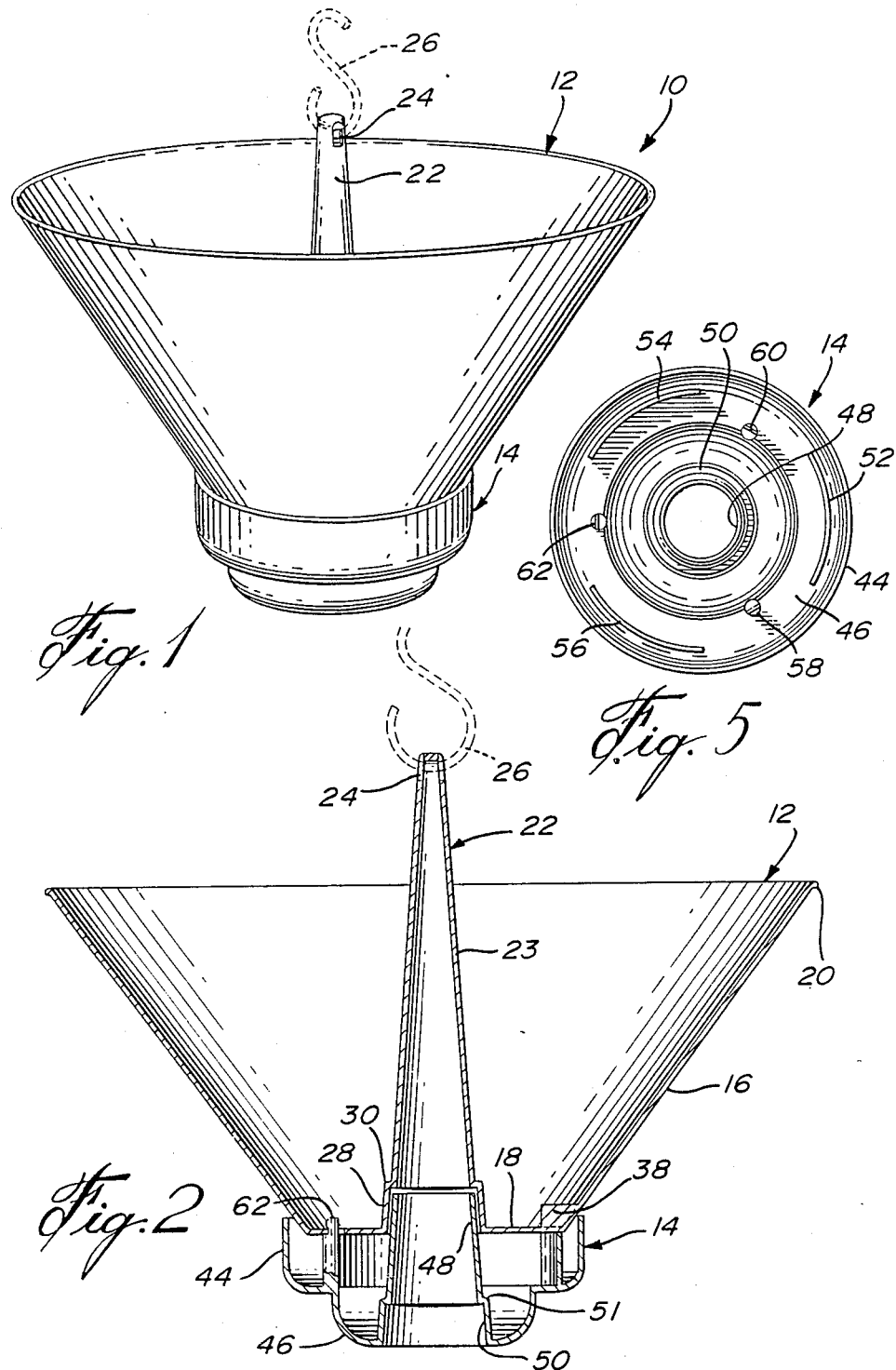

FLOWER POT AND SAUCER

FIELD OF THE INVENTION

The present invention relates to a plant assembly formed of a pot and a saucer and, more particularly, to a pot-and-saucer assembly which is adapted to be nested with similarly constructed assemblies.

BACKGROUND OF THE INVENTION

Plant holders usually comprise a pot or bowl adapted to receive a plant or plants and a saucer or container in which the pot or bowl sits and can receive water which drains from the pot. The pot and saucer have interengaging parts which locate them relative to one another. Some pots have an elongated upstanding suspension member which is connected centrally to the pot and have an attachment element at its upper end whereby the plant holder may be suspended in use.

Difficulties have arisen for transporting cheaply and easily these pots and saucers. In some cases, these pots and saucers are constructed so that they can be nested together. However, problems occur due to this nesting feature and some means, such as paper or cartons, must be used between the nested pots and the nested saucers to facilitate their removal at the store where they are sold.

OBJECTS AND STATEMENT OF THE INVENTION

It is an object of the present invention to provide a plant assembly that includes a pot and a saucer which are interconnected together at the manufacturing plant and wherein the assembled pot and saucer is then nested with similarly constructed assemblies for inexpensive and easy transit.

The present invention therefore relates to a plant pot-and-saucer assembly adapted to be nested in similarly constructed assemblies wherein the pot and the saucer forming the assembly each includes means cooperating to mount the saucer to the lower part of the pot. The pot consists of an inverted frustoconical body having a bottom wall, an upper open end and an elongated hollow suspension member that extends upwardly from and is contiguous with the bottom wall; the suspension member has a conically-shaped side wall with an enlarged area in the lower region thereof. The saucer consists of a cylindrical body having a bottom portion and a hollow frusto-conical central portion that extends upwardly from and is contiguous with the bottom portion; the central portion is so configured as to fit partially within the enlarged area of the suspension member and has an enlarged area in the lower region thereof so configured as to fit over the enlarged area of the suspension member of the lower similarly constructed plant assembly nested therebeneath. The enlarged area on the side wall of the suspension member defines a support for an upper similarly constructed plant assembly.

In one form of the invention, the bottom portion of the saucer comprises a series of arc-shaped upwardly projecting walls to support the bottom wall of the suspension member.

In another form of the invention, the side wall of the central portion of the saucer extends in the prolongation of the side wall of the suspension member.

In a preferred form of the invention, the angle of the side wall of the suspension member is about 3° to 5°, preferably 4°, relative to a vertical symmetrical axis of the pot. Similarly, the inclination of the side wall of the inverted frusto-conical body of the pot is preferably 52° relative to a horizontal plane passing through the bottom wall of the pot.

Other objects and further scope of applicability of the present invention will become apparent from the detailed description given hereinafter. It shoud be understood, however, that this detailed description, while indicating preferred embodiments of the invention, is given by way of illustration only, since various changes and modifications within the spirit and scope of the invention will become apparent to those skilled in the art.

BRIEF DESCRIPTION OF THE DRAWINGS

FIG. 1 is a perspective view of an assembly of a pot and a saucer made in accordance with the present invention;

FIG. 2 is an elevation cross-sectional view of the assembly shown in FIG. 1;

FIG. 5 is a top plan view of the saucer with the pot removed.

DESCRIPTION OF PREFERRED EMBODIMENTS

Figure 3:
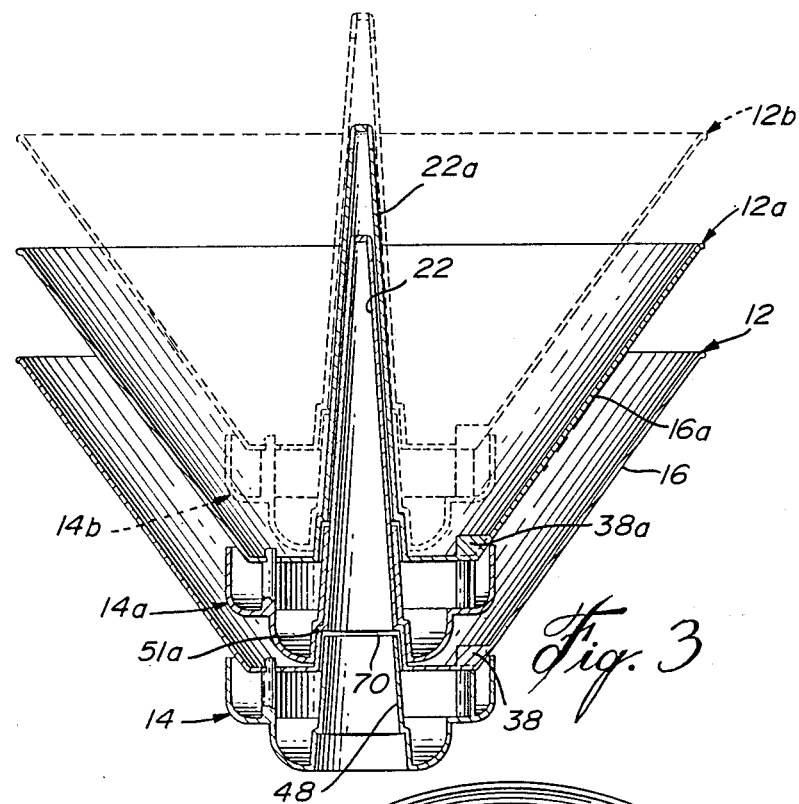
FIG. 3 is an elevation cross-sectional view of nested assemblies.

Referring to FIG. 1, there is shown an assembly, generally denoted 10, that is formed of a pot 12 adapted to receive a plant or plants and of a saucer 14 adapted to receive water which drains from the pot in use.

Referring to FIG. 2, the pot consists of an inverted frusto-conical body having an inclined side wall 16, a bottom wall 18 and an open upper end displaying a rounded edge 20. A suspension member 22 extends upwardly from the bottom wall 18 with which it is contiguous. The suspension member has a conically-shaped side wall 23 with an aperture 24 at the upper end thereof to receive an attachment element 26 shown in dotted lines. The lower part of the side wall 23 has an enlarged area 28 defining an annular shoulder 30. The inclined plane of the side wall 28 of the enlarged area is offset but parallel to the plane of the side wall 23 of the suspension member 22. In a preferred form of the invention, the angle of the side wall 23 of the suspension member 22 is about 3°-5°, preferably 4°, relative to a vertical symmetrical axis of the pot. Similarly, the inclination of the side wall 16 of the inverted frusto-conical body of the pot is preferably 52° relative to a horizontal plane passing through the bottom wall 18 of the pot 12.

Figure 4:
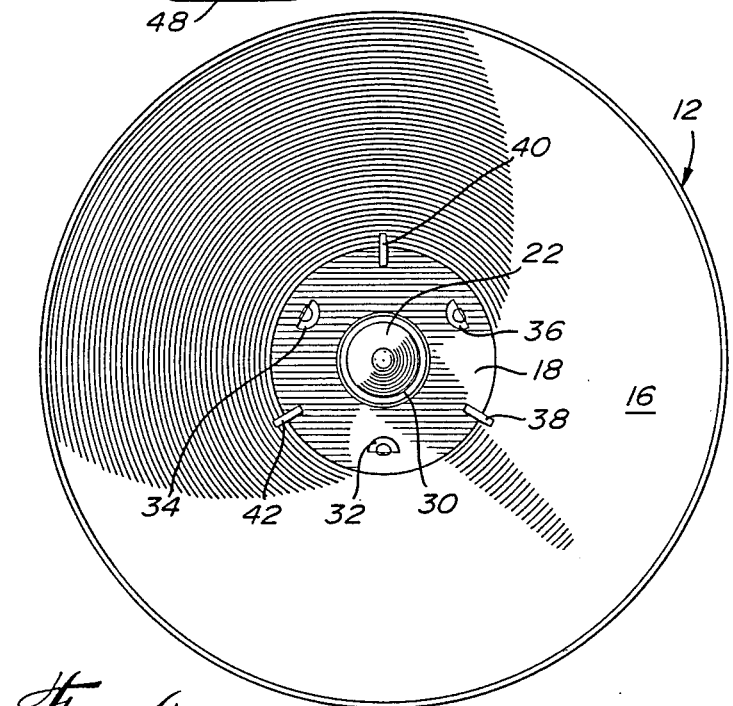
FIG. 4 is a top plan view of the assembly.

Referring to FIG. 4, the bottom wall 18 of the pot 12 displays three circumferentially spaced openings 32, 34 and 36 which provide draining apertures for the water when the pot is in use. Also displayed on the bottom wall and in the lower part of the side wall 16 are three circumferentially spaced stoppers 38, 40 and 42, the function of which will be described hereinbelow.

Referring to FIG. 2, the saucer 14 includes a cylindrical side wall 44, a bottom wall 46 and a hollow frusto-conical central portion 48 which extends upwardly from and is contiguous with the bottom wall 46. This central portion has an enlarged area 50 in the lower part thereof, the plane of which is offset and parallel to the remaining upper portion of the side wall 48. The enlarged area 50 defines an annular shoulder 51, the function of which is described hereinbelow. The upper portion of the central part 48 extends in the prolongation of the side wall 23 of the suspension member, with an upper part of the central portion being confined within the enlarged area 28 of the suspension member.

Referring more particularly to FIG. 5, the bottom wall 46 of the saucer displays three circumferentially spaced arc-shaped upwardly projecting walls 52, 54 and 56 which, as shown in FIG. 2, serve to support the bottom wall 18 of the pot 12. Also displayed on the bottom wall 46 are three upwardly extending cylindrical members 58, 60 and 62, the upper parts of each having a reduced area so that they can penetrate in their respective openings 32, 34 and 36 of the bottom wall 18 of the pot so that the saucer and pot may interengage.

The entire assembly consisting of the pot and the saucer is made of moulded plastic materials having a certain resiliency so that members 58, 60 and 62 may flex to snap in and out of their respective openings in the bottom wall 18 of the pot.

Referring to FIG. 3, the particular configuration of the assembly of pot 12 and saucer 14 is such that it can be nested at the manufacturing plant with similarly constructed assemblies 12a-14a, 12b-14b, etc. and then transported as such to the store. Assembly 12a-14a is nestingly supported on the assembly 12-14 by sliding the suspension member 22a over the suspension member 22 until the inner wall of shoulder 51a of saucer 14a contacts the outer wall of the shoulder 30 of the suspension member 22 of lower assembly 12-14. This is the only contact area between the two superposed assemblies. The reduced upper area of members 58, 60 and 62 is configured as to leave a small gap 70 between the upper edge of the central part 48 of the saucer and the inner wall of the shoulder 30 of the suspension member 22. Stoppers 38, 40 and 42 are provided to prevent two nested pots from being jammed together should they be nested without their saucers assembled thereto.

Although the invention has been described above in relation to one specific form, it will be evident to a person skilled in the art that it may be refined and modified in various ways. It is therefore wished to have it understood that the present invention ought not to be limited in interpretation, except by the terms of the following claims.

The embodiments of the invention in which an exclusive property or privilege is claimed are defined as follows:

1. A plant assembly including a pot and a saucer adapted to be nested together in similarly constructed assemblies, said pot and saucer including means cooperating to mount said saucer to the lower part of said pot; said pot consisting of an inverted frusto-conical body having a bottom wall, an upper open end and an elongated hollow suspension member extending upwardly from and being contiguous with the bottom wall; said suspension member having a conically-shaped side wall with a first area in the lower region thereof that is enlarged with respect to the inherent dimensions of said suspension member side wall;
said saucer consisting of a cylindrical body having a bottom portion and a hollow frusto-conical central portion extending upwardly from and contiguous with said bottom portion; said central portion being so configured as to fit partially within said first enlarged area of said suspension member and having a second enlarged area in the lower region thereof so configured as to fit over said first enlarged area of the suspension member of a lower similarly constructed plant assembly nested therebeneath; and
said first enlarged area defining a support for an upper similarly constructed plant assembly.

2. An assembly as defined in claim 1, wherein said support consists of an annular shoulder defined in the outer side wall of said suspension member.

3. An assembly as defined in claim 1, wherein said pot and said saucer are each unitary bodies formed of moulded plastic material.

4. An assembly as defined in claim 1, wherein said cooperating means include aperture means in said bottom wall of said pot and upstanding means extending from and integrated with said bottom portion of said saucer, said upstanding means protruding and engaging said aperture means of said pot.

5. An assembly as defined in claim 4, wherein said bottom portion of said saucer further includes a series of arc-shaped upwardly projecting walls for supportingly receiving the bottom wall of said suspension member.

6. An assembly as defined in claim 1, further comprising aperture means at the upper end of said suspension member for receiving attachments for hanging said assembly.

7. An assembly as defined in claim 6, wherein the upper end of said suspension member extends vertically above a plane that includes the upper open end of said pot.

8. An assembly as defined in claim 7, wherein the upper edge of the open end of said pot is rounded.

9. An assembly as defined in claim 1, comprising stopper means on the bottom wall of said pot for providing support of an upper similarly constructed assembly whenever an accidental excessive force causes the enlarged area of the support to be passed.

10. An assembly as defined in claim 9 wherein said suspension member is hollow,.

11. An assembly as defined in claim 1, wherein the side wall of the central portion of the saucer extends in the prolongation of the side wall of the suspension member when a saucer and a pot are assembled.

12. An assembly as defined in claim 11, wherein the angle of the side wall of the suspension member is about 3° to 5° relative to a vertical symetrical axis of said pot.

13. An assembly as defined in claim 12, wherein said angle is 4°.

14. An assembly as defined in claim 13 wherein the angle of the side wall of the inverted frusto-conical body of the pot is 52° relative to a horizontal plane passing through the bottom wall of said pot.

15. An assembly as defined in claim 1, 12 or 13, wherein the angle of the side wall of the inverted frusto-conical body of the pot is 52° relative to a horizontal plane passing through the bottom wall of said pot.

16. An assembly as defined in claim 12 wherein the angle of the side wall of the inverted frusto-conical body of the pot is 52° relative to a horizontal plane passing through the bottom wall of said pot.

17. An assembly as defined in claim 1 wherein said suspension member is hollow.

18. A plant assembly including a pot and a saucer adapted to be nested together in similarly constructed assemblies, said pot and saucer including means cooperating to mount said saucer to the lower part of said pot:
said pot comprising an inverted frusto-conical body having a bottom wall, an upper open end and an elongated hollow suspension member extending upwardly from and being contiguous with the bottom wall; said suspension member having a conically-shaped side wall with a first external shoulder thereof, larger than the inherent conical taper of said suspension member side wall;

said suspension member being hollow;

said saucer comprising a cylindrical body having a bottom portion and a hollow frusto-conical central portion extending upwardly from and contiguous with said bottom portion;

said central portion being configured so as to fit partially within the area defined by said first external shoulder of said suspension member and having a second external shoulder in the lower region thereof so configured as to fit over the first external shoulder of the suspension member of a lower similarly constructed plant assembly nested therebeneath; and the first external shoulder of the side wall of the suspension member defining a support for an upper similarly constructed plant assembly.

19. An assembly as defined in claim 18, comprising stopper means on the bottom wall of said pot for providing support of an upper similarly constructed assembly whenever an accidental excessive force causes the enlarged area of the support to be passed.

20. An assembly as defined in claim 18 wherein the angle of the side wall of the suspension member is about 3°–5° relative to a vertical symmetrical axis of said pot, and wherein the angle of said side wall of said inverted frusto-conical body of the pot is 52° relative to a horizontal plane passing through the bottom wall of said pot.

* * * * *